United States Patent
Benaglio et al.

(10) Patent No.: US 6,958,170 B2
(45) Date of Patent: Oct. 25, 2005

(54) PROCESS FOR COATING DRAWN METAL PARTS

(75) Inventors: John A. Benaglio, Cromwell, CT (US); Grant Demerchant, Plantsville, CT (US); Volker Seefeldt, Marsberg (DE)

(73) Assignee: Truelove & Maclean, Inc., Waterbury, CT (US)

( * ) Notice: Subject to any disclaimer, the term of this patent is extended or adjusted under 35 U.S.C. 154(b) by 0 days.

(21) Appl. No.: 10/705,482

(22) Filed: Nov. 10, 2003

(65) Prior Publication Data

US 2004/0126500 A1    Jul. 1, 2004

Related U.S. Application Data

(60) Provisional application No. 60/437,531, filed on Dec. 31, 2002.

(51) Int. Cl.[7] .............................................. B05D 1/02
(52) U.S. Cl. .................... 427/8; 427/424; 427/427.2; 427/427.3; 427/287; 118/314
(58) Field of Search ............................ 427/421, 8, 230, 427/231, 232, 233, 234, 235, 236, 237, 238, 427/239, 421.1, 424, 427.3, 427.2, 287; 901/43; 118/314

(56) References Cited

U.S. PATENT DOCUMENTS

| | | | |
|---|---|---|---|
| 3,521,598 A | | 7/1970 | Straw |
| 4,060,052 A | * | 11/1977 | Algeri et al. ............... 118/682 |
| 4,089,998 A | | 5/1978 | Gibson |
| 4,693,376 A | * | 9/1987 | Marion et al. ............... 209/552 |
| 6,063,195 A | * | 5/2000 | Giesinger et al. ........... 118/712 |
| 6,325,198 B1 | * | 12/2001 | Pattantyus-Abraham et al. ........................ 198/339.1 |

FOREIGN PATENT DOCUMENTS

| | | |
|---|---|---|
| GB | 2269767 | 2/1994 |
| GB | 2333998 | 8/1999 |
| JP | 04365709 A | 12/1992 |

* cited by examiner

Primary Examiner—Katherine Bareford
(74) Attorney, Agent, or Firm—Carmody & Torrance LLP

(57) ABSTRACT

Process for using coating guns to apply a conductive layer to the inside of battery cans moving on a conveyor with intermittent move and dwell times. Pats are automatically inspected. If a layer is defective due to a disabled coating gun, the process includes firing another coating gun at twice its normal firing rate and/or shifting its position so that it does the job of two coating guns.

6 Claims, 5 Drawing Sheets

PROCESS FOR COATING DRAWN METAL PARTS

CROSS REFERENCE TO RELATED APPLICATIONS

This application claims priority of provisional application Ser. No. 60/437,531 filed Dec. 31, 2002.

BACKGROUND OF THE INVENTION

This invention relates to a high volume manufacturing process for continuously coating and inspecting drawn metal parts as part of a continuous series of operations to produce finished drawn metal parts. An example of high volume manufacturing of drawn metal parts is the production of battery cans, which are used as the primary battery casing for commercial cells, such as A, AA, AAA, C, D, F, M, etc.

Manufacturing of battery cans according to the prior art is generally accomplished by a batch and queue process in the following manner. A redraw press accepts narrow strip stock from a payoff reel and performs blanking, cupping and subsequent redraw operations. The entire battery can is manufactured in each stand-alone redraw press and the cans are collected in bulk in containers. The press operator and/or toolmaker manually inspect the dimensional and cosmetic attributes of the can. A pre-determined number of cans are removed randomly and inspected. Next the containers of parts from the press are moved to a staging area near a washer/dryer machine. The washer/dryer, which removes the drawing lubricant, is typically a rotary bulk washer with a cob dryer. An operator feeds the cans into the inlet of the washer. The washed cans are caught in bulk hoppers or cartons.

Next the washed cans are moved to a staging area near a coating machine. The coating machines apply thin film of coating material to the interior of the can. The cans are dried in bulk in a curing oven. An operator feeds the cans to the coaters. The cans are inspected for proper coating and then placed into the final packaging containers.

The batch and queue process described above has several disadvantages. The narrow strip stock produces significant scrap, due to unusable material at the edge of the strip. The required coil changes to feed the narrow strip stock to the redraw press lead to inefficiencies in operation. Damage can occur due to parts contacting other parts in the batch containers. Rejection of parts due to dimensional, coating and cosmetic defects may be inconsistent due to using different inspectors.

Another disadvantage is the requirement to follow the parts produced by a particular tool through the manufacturing process by keeping track of the batch container corresponding to each tool. This is necessary in order to halt operation from a particular redraw press and take corrective action if dimensional changes occur due to tool wear. Manual operator time is required to move batch containers from one operation to the next while retaining identification of the batch with the tool producing the part.

Accordingly, one object of the present invention is to provide a continuous high volume process for coating and inspecting the coating on drawn metal parts.

Another object of the invention is to provide an improved continuous process for tracking drawn metal parts through coating operations so as to identify the coating gun that coated the parts.

Still another object of the invention is to provide an improved process for inspecting coated parts and taking corrective action to shut down the coating gun if the coating is defective.

Another object of the invention is to provide an improved process for coating and inspecting the coating on drawn metal parts, and substituting additional coating guns if a coating gun is defective.

SUMMARY OF THE INVENTION

Briefly stated, the invention concerns a process for coating and inspecting drawn metal parts, comprising the steps of: providing a single ordered stream of drawn metal parts having a repeating sequential order, said repeating sequential order enabling identification of the drawn metal part by the location of the drawn metal part in said ordered stream; conveying said ordered stream with continuous movement of the drawn metal parts; converting the movement of the ordered stream into an intermittent motion having a move time and a dwell time; providing a plurality of coating guns; coating pre-selected portions of a selected drawn metal part during a first dwell time with a first coating gun; providing automatic inspection means for determining if the coating is defective; inspecting the coating of said selected drawn metal part with said automatic inspection means during a second dwell time; shutting down said first coating gun if the coating is defective, said selected coating gun being identified by the location of the removed drawn metal part in the ordered stream; and enabling a second coating gun to coat drawn metal parts in the same sequential location in the ordered stream that was previously assigned to the first coating gun. The enabling step is preferably carried out by firing the second coating gun at twice its normal firing rate, including shifting the position of the second coating gun in some cases.

DRAWING

The invention will be better understood by reference to the following description, taken in connection with the accompanying drawing, in which.

Figure 3:
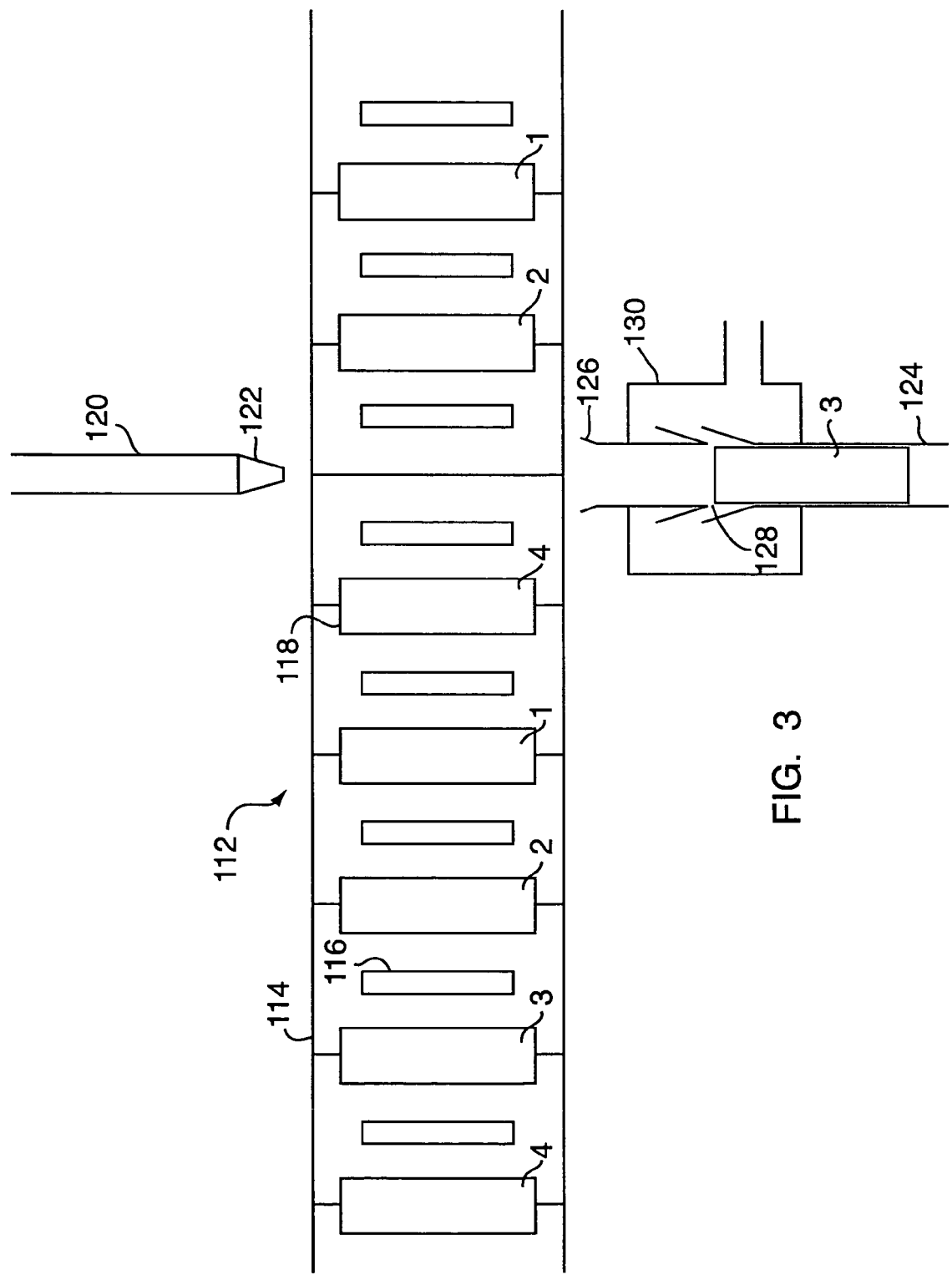
Figure 4:
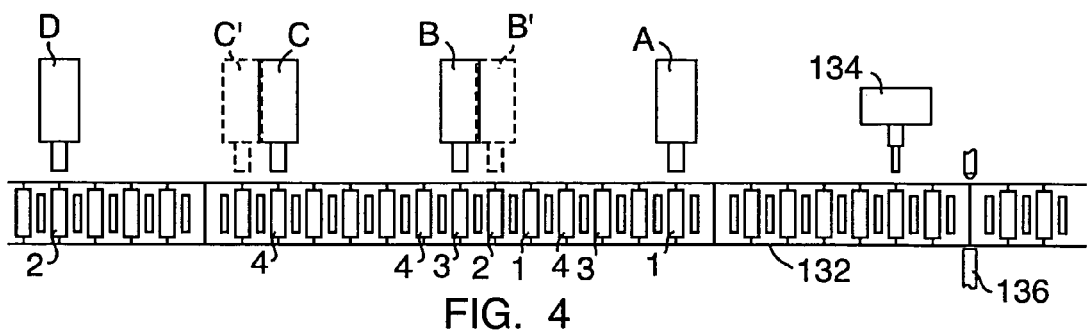
Figure 5:
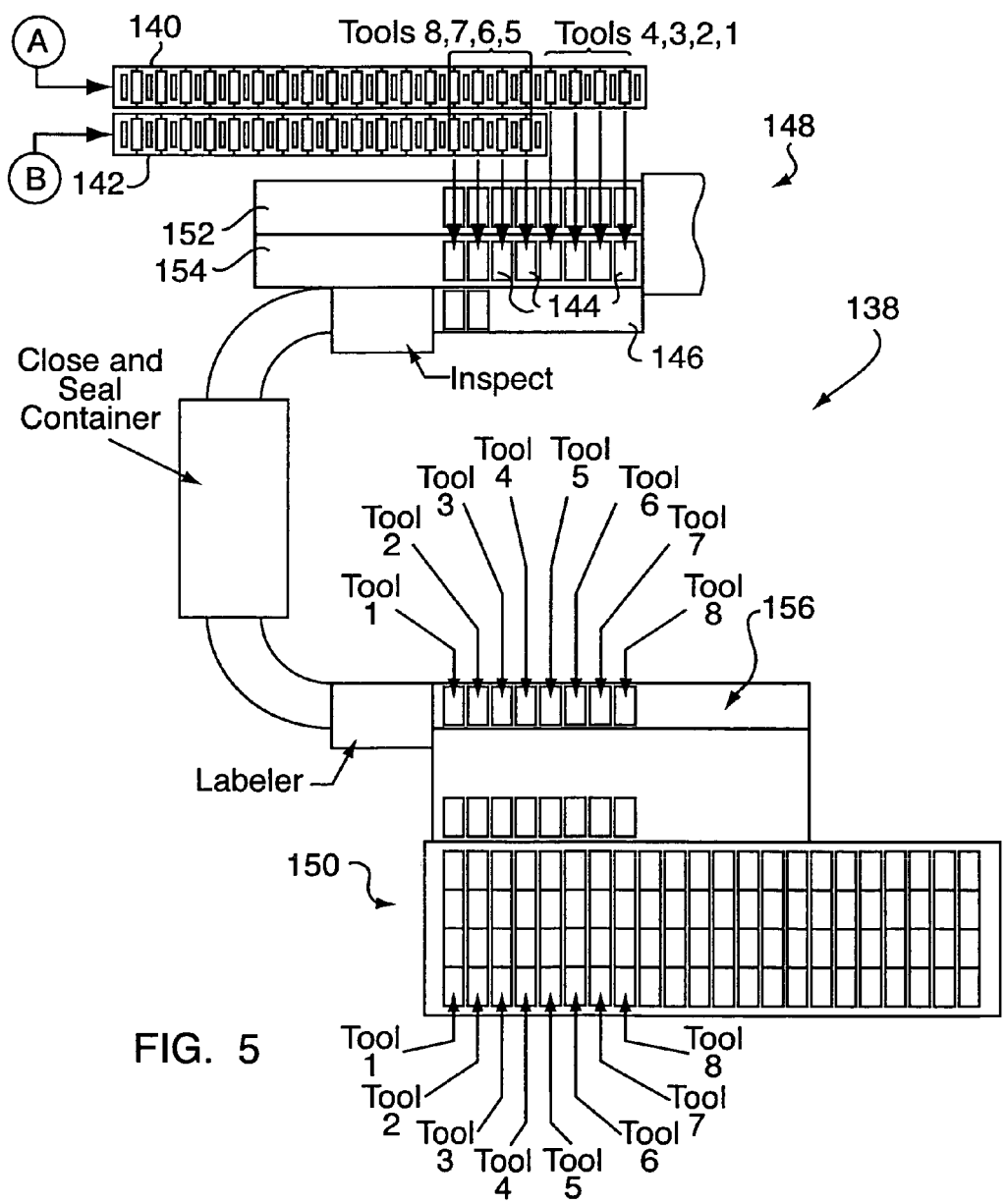
Figure 6:
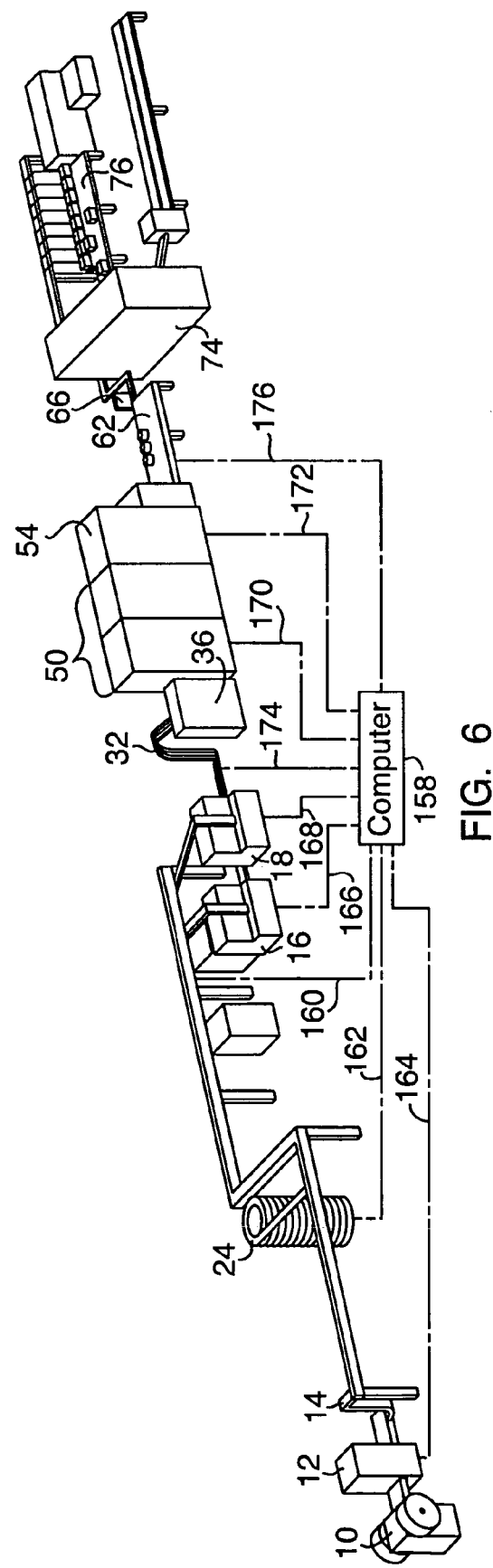

FIG. 3 is a schematic representation of portions of a conveyor, with means to remove a part for inspection, FIG. 4 is a schematic representation of apparatus used to coat drawn metal parts, FIG. 5 is a schematic diagram of the packing process, and FIG. 6 is a perspective view of a computer generated model showing the actual placement of equipment, with simplified diagram of the process computer controls.

GENERAL DESCRIPTION OF THE PROCESS

Figure 1:
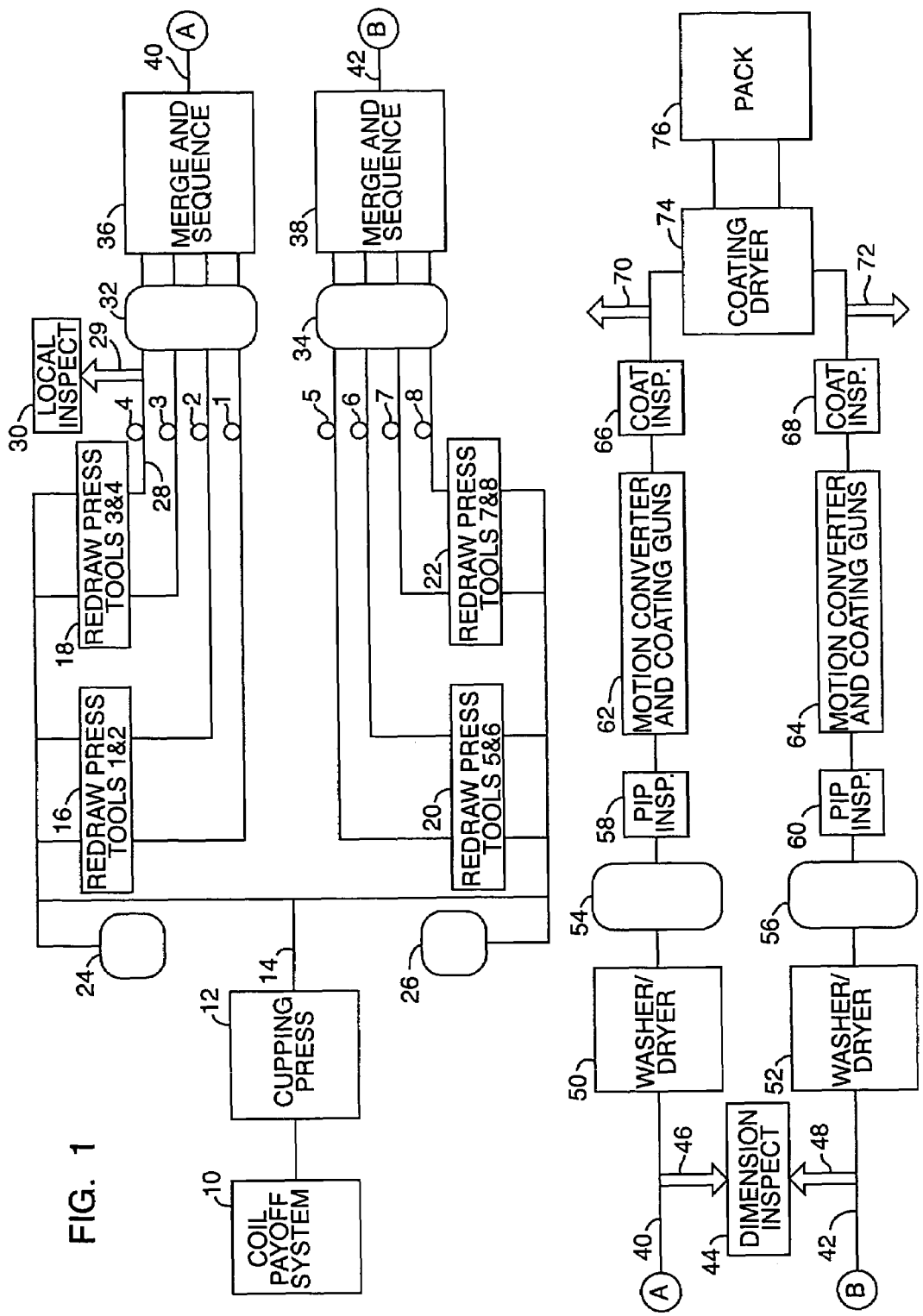
FIG. 1 is a simplified block diagram of the manufacturing process.

Referring to FIG. 1 of the drawing, a coil payoff system 10 feeds a cupping press 12 with a wide strip of thin metal from a coil. Cupping press 12 performs a blanking and drawing operation to produce seven cups at a stroke, which are fed onto a magnetic conveyor 14. The flow of parts from the cupping press 12 divide into two "cells" A and B. Either cell A or B may operate independently of the other throughout much of the manufacturing process, even though they rejoin to share some equipment toward the end of the process.

Conveyor 14 supplies the cups to redraw presses 16, 18 in cell A and to redraw presses 20, 22 in cell B. In order to provide for possible downtime of cupping press 12 and/or redraw presses, part accumulators 24, 26 act as buffers to receive or discharge cups as necessary. Accumulators 24, 26 are towers with helical tracks for temporary storage of parts with control means to switch parts to the presses if the cupping press is not operating, but any type of storage capable of accumulating and discharging parts via conveyors will be suitable.

The redraw presses 16, 18, 20, 22 each are equipped with at least two sets of redraw stations, hereinafter defined "tools". As defined in this patent application, a "tool" (singular) is actually a set comprising several redraw punches and dies, which successively draw the cups into the final dimensional shape of a battery can and cut off the top rim of the can. Thus, in the illustration shown, each press handles two "tools" and, therefore, produces two parts during each stroke. However, more than two tools per press are also possible.

Battery cans from each of the tools in each of the redraw presses are discharged onto a separate conveyor, such as that indicated by reference number 28. Means are provided to remove a sample for local inspection as shown at 30. While a single conveyor 28 and its inspection station 30 are indicated on the drawing for tool number four of redraw press 18, a similar arrangement is placed at the tool discharge of each redraw press. If there are more than tools in each redraw press, additional conveyors will be required, one for each tool.

Battery cans 1, 2, 3, 4 from presses 16, 18 in cell A are separately accumulated in four serpentine tracks, one for each tool, in an accumulator 32. Similarly battery cans 5, 6, 7, 8 from redraw presses 20, 22 in cell B are separately accumulated in four serpentine tracks in accumulator 34.

A special ordered merge device 36 in cell A and an identical device 38 in cell B perform an ordered merge operation to be described later in detail. Briefly the separate streams of parts from the tools of each of the presses are merged into a single ordered stream of parts maintaining a sequential order that enables identification of the tool by the location of the part in the stream. This ordered stream of parts is represented by the dashed lines 40–42 representing the conveyors from the ordered merge 36, 38.

An automatic dimensional inspection machine 44 is shared by both cells A and B and equipped with instruments, which measure certain critical dimensions in the battery cans. Part ejectors 46, 48 are precisely controlled to remove a part from a pocket on a conveyor 40, 42 and place it in the dimensional inspection equipment 44. It is important to note that the empty pocket in the conveyor from which the part is removed is maintained throughout the manufacturing process, so that the integrity of the ordered stream is maintained as the battery cans move through the process. This integrity is maintained when parts are transferred from one conveyor to the next.

Battery cans from cell A and cell B are conveyed to washer/dryers 50, 52 respectively. There, the drawing compound is removed and the battery cans dried. Thereafter, each washer/dryer 50, 52 supplies a buffer 54, 56 respectively. Buffers 54, 56 are maintained half-full by a moveable bridge mechanism. The buffer level controls the speed of the coating/inspection conveyor downstream of it.

Optical camera inspection systems 58, 60 measure the streams of battery cans from the buffers 54, 56. The parts are fed in order maintaining gaps for any missing parts, onto special motion converting conveyors 62, 64 equipped with coating guns. These devices will be described further in detail, but, briefly stated, the continuously moving stream of parts is converted to an intermittently moving or indexed motion having a dwell time and a move time. During the dwell time, the cylindrical battery cans are rotated while they are sprayed on the inside with coating guns. Following the coating operation, an automatic optical inspection system at 66, 68 inspects internal coating, and any cosmetic anomalies on the exterior of the battery can. Rejects are automatically removed by part ejectors 70, 72. The parts, still segregated in the respective conveyor pockets for the two cells A, B move to a coating dryer 74 and, from there, to the pack operation indicated at 76.

Ordered Merge Operation

While the preceding section describes the overall process for manufacturing drawn metal parts in a general discussion, several aspects of the process will be described in detail. One of these is the ordered merge operation, which combines the separate streams of parts from the separate drawing press tools in such a way that the sequence is always the same and is repeated periodically. In this way, the segregated stream of parts are merged into a single ordered stream of drawn metal parts having a sequential order which enables identification of the drawing press tool in which the part was made.

Figure 2:
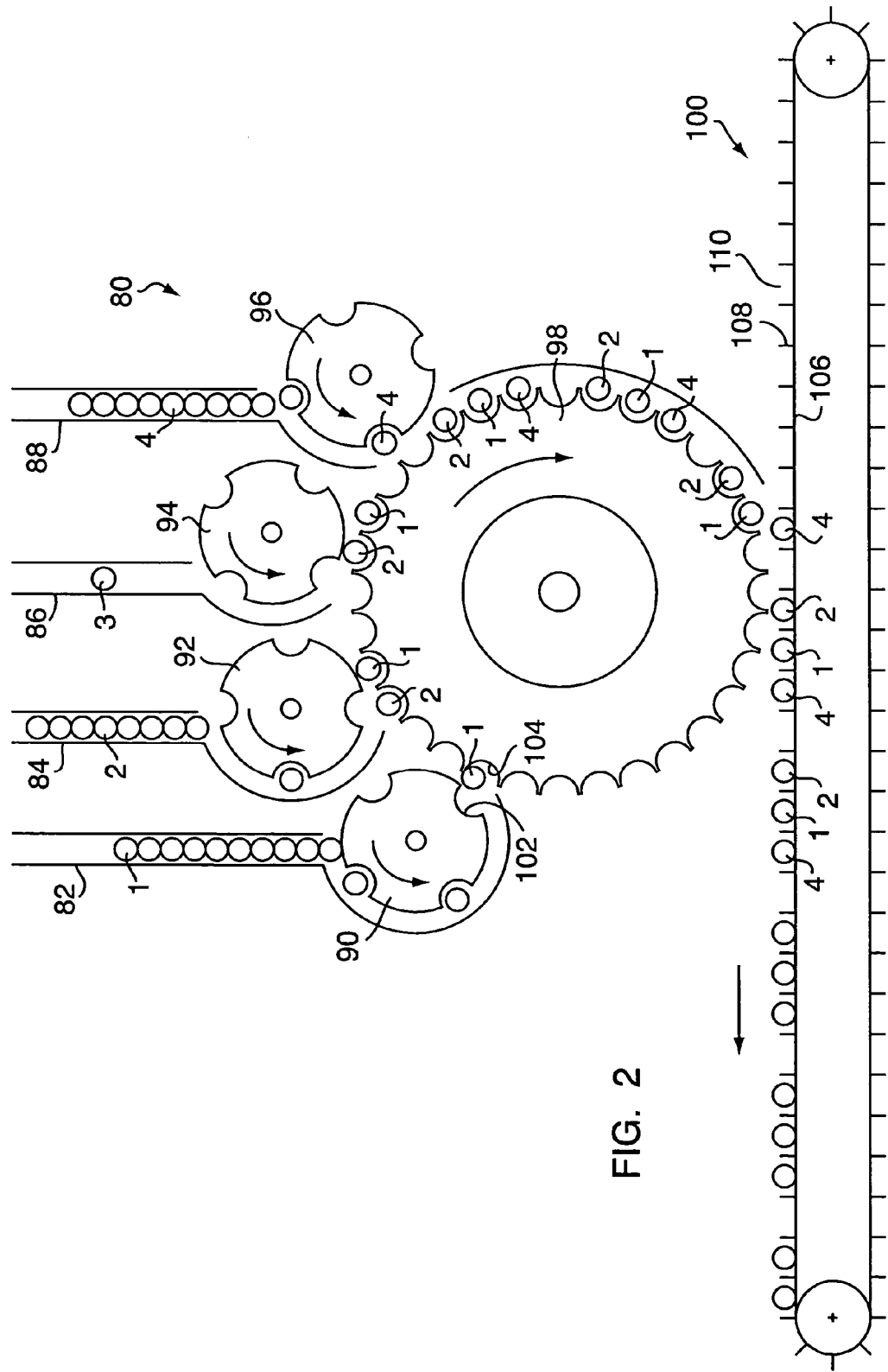
FIG. 2 is a schematic representation of a merge and sequence machine.

FIG. 2 illustrates in simplified diagrammatic fashion the ordered merge operation. It will be understood that the actual configuration will vary according to size and type of the parts, as well as variations in the components. The ordered merge machine is shown generally at 80 and comprises four separate accumulating receptacles 82, 84, 86, 88. These are part of the accumulators 32 or 34 shown in FIG. 1. Each such accumulating receptacle receives drawn metal parts from a different tool, in this case parts 1, 2, 3 and 4 coming from tool one, tool two, tool three, and tool four respectively of presses 16, 18 (FIG. 1). Whenever parts 1, 2, 3 and 4 are depicted in the following drawings, they are deemed to be from their corresponding source tool, although they may appear at different places in the processes to be described. Accumulating receptacles 82, 84, 86, 88 supply feed wheels 90, 92, 94, 96 respectively. The feed wheels supply parts to a merge wheel 98 which feeds a conveyor 100. The feed wheels have pockets, such as 102, and the merge wheel 98 has pockets, such as 104. The feed wheels are mechanically geared to the merge wheel, so that a pocket 102 on an feed wheel registers with every fourth pocket 104 on the merge wheel as the wheels turn.

If there are more than two tools on each redraw press, e.g., three tools, the feed wheels and index wheels must be modified accordingly to include the proper number of pockets.

Conveyor 100 is designed to have a carrier belt 106, with dividing walls 108 providing segregated pockets 110. The speed of the conveyor 100 is timed to coincide with the speed of the merge wheel 98, so that the pockets 104 on the merge wheel feed the segregated pockets 110 on the conveyor in precise order. FIG. 2 illustrates that accumulating receptacle 86 was temporarily empty, so that feed wheel 94 was previously not feeding parts 3 to the designated pocket on merge wheel 98. Therefore the segregated pockets 110 on conveyor 100 are temporarily empty, but the single ordered stream of parts continues to flow to the next intermediate processing operation.

Part Ejectors

The process provides for removal of parts at various points of the process for dimensional inspection, for local tool maker inspection, for defects located at any point in the process. Such part ejectors are shown on FIG. 1, for example, at 29, 46, 48, 70, 72. FIG. 3 illustrates schematically, in simplified form, the operation of such a part ejector. A conveyor 112 is made up of articulated links 114 hinged together at pivot points (not shown). Each such link has a divider wall 116 projecting upwardly from the link platform. The space between divider walls 116 provides segregated pockets for the parts 1, 2, 3, 4 supported on the platforms of the articulated links 114. The drawn metal parts are cylindrical and each has an open end 118, as is typical of battery cans and similar drawn parts.

Removal of parts is accomplished with an air jet 120 having a tip 122 aligned with the open end of the parts, and a collection tube 124 having an open end 126 aligned with the axis of the air jet. The collection tube is provided with directed openings 128 which are, in turn, surrounded by a manifold 130. When it is desired to remove a part, air jet 120 and manifold 130 are supplied with a blast of high pressure air, pushing the part 3 into the open end 126 of the collection tube 124. Air entering the manifold 130 and openings 128 propels the part 3 through the tube to a collection point (not shown).

This arrangement is known as a "bazooka", and may be either automatically or manually actuated to remove a part from a segregated pocket. Since the parts are in sequence, the part corresponding to any selected tool source may be removed. The location of the pocket on the conveyor is a function of the conveyor speed which is precisely known by an encoder, and controlled by a programmed logic computer (see FIG. 6).

Coating Operation

Referring to FIG. 4 of the drawing, a conveyor 132 is provided with a known type of mechanism (not shown) to convert a continuous movement to an indexed movement having a move time and a dwell time. The coating operation involves spraying a conductive coating into the open ends of the drawn metal parts. Coating is accomplished by means of coating spray guns A, B, C, D. These are spaced along conveyor 132, which is moving from left to right in the drawing, so that each spray gun is automatically actuated to spray a jet of coating material into the open end of the part during the dwell time of conveyor 132. Rotating apparatus (not shown) is also provided to rotate the cylindrical parts about their axis while the spray gun is active so as to obtain a uniform coat. Spray guns A, B, C, D are spaced along conveyor 132, so that coating gun A coats the inside of part 1, coating gun B coats the inside of part 3, coating gun C coats the inside of part 4, and coating gun D coats the inside of part 2.

Because of the possibility that one or more coating guns may become inoperative, a unique system is employed to enable a coating gun to take over the job of an inoperative coating gun, while continuing to process its previously assigned part. The coating guns are capable of firing twice as fast as their normal firing rate. Also, coating guns B and C are able to shift one position along conveyor 132 to the alternate respective positions indicated by reference letters B', C'.

Method 1: If gun B should become inoperative, it will be observed that coating gun A may be operated at twice its normal firing rate to coat parts 1 and 3. Similarly, gun B may take over for gun A should gun A become inoperative. In a similar manner, guns C and D may assume the duties for each other by firing at twice the normal rate.

Method 2: Should both guns C and D become temporarily inoperative, gun B may be shifted to position B'. With both guns A and B' firing at twice the normal rate, they can take over the job of coating all four parts. In a similar manner if both guns A and B become temporarily inoperative, gun C may be shifted to C' and guns C' and D, firing at twice the normal rate will coat all four parts.

The coated parts are inspected by an optical inspection system 134 and removed by a parts ejector 136 if they should be unacceptable.

Packing Segregated by Tool

Referring to FIG. 5 of the drawing, a packing area shown generally as 138 receives an ordered stream of parts 1, 2, 3, 4 on a conveyor 140 from cell A and a second ordered stream of parts 5, 6, 7, 8 on a conveyor 142 from cell B. In keeping with the philosophy of the inventive process, some of the pockets of the conveyors may be empty because of removal of parts upstream for various purposes. A series of receptacles 144 are provided, each one from a different tool. A U-shaped conveyor 146 carries boxes of parts from a box filling area shown generally as 148 to a box collection area shown generally as 150.

Empty boxes are supplied along a first table (or conveyor) 152. Boxes being filled are stationed along a second table (or conveyor) 154 and, when full, are pushed onto conveyor 146. The filled boxes are then conveyed to a specific collection station, such as the one designated at 156. From there they are removed for shipment, the boxes being coded to designate the source tool from which they were manufactured.

Dimensional Test Unit

Referring to FIG. 1 of the drawing, dimensional inspection is carried out by dimensional test unit 44. This unit is designed to measure, via touch probes, pre-defined dimensions on the parts. The unit will measure parts from eight tools plus allowance for manual insertion/inspection of parts. The unit provides for measuring, indexing and discharge of parts. A detailed description of the device as used to measure that parts is beyond the scope of this application. However, such devices are known in the prior art. Part ejectors such as previously mentioned in connection with FIG. 3 are attached to conveyors feeding the washer/dryers 50, 52, as indicated at 46, 48 in FIG. 1. The parts are introduced vertically, closed end down. An electromagnetic brake holds the part momentarily, and then releases the part into the pocket in the dimensional test unit 44. When the dimensional test unit is in automatic mode, parts are requested for dimensional measurement in a pre-selected sequence. A signal is received from an encoder on the conveyor informing it that the requested part is positioned in front of the part ejector. The part ejector is activated and the part enters the dimensional test unit.

The dimensional test unit measures a part approximately every 10 seconds. If eight tools are running, there will be an 80 second delay between the time a part is measured and the time a part from the same tool is measured again. If a defective part is detected, a second part from the same tool should be requested as soon as possible to verify the original result. Since the line is continuing to move, there could be a considerable number of defective parts downstream, as well as those upstream from the defective tool. The dimensional test unit sends the appropriate signals to stop the press with the defective tool, to stop the discharge conveyor from the appropriate buffer 54, 56, and to activate appropriate parts ejectors to purge the line of all parts from that tool, both upstream and downstream. Corrective action on the defective tool may then be taken, while the line continues to run, maintaining empty pockets corresponding to those pre-selected for that particular tool.

Process Speed Control

The manufacturing system includes various safeguards and control devices to maintain production of drawn metal parts in an optimum manner, and maximize overall production, while assuring that failure or defective operation of any piece of equipment does not shut down the entire line. Reference to FIG. 6 shows a perspective view of the actual configuration of the production line. Only cell A is indicated on the drawing, along with apparatus that is shared by cells A and B. The reference numbers of the pieces of equipment correspond to those in FIG. 1. A programmed logic computer 158 is representative of one or more programmed logic computers receiving signals and sending commands represented by phantom lines. Any deficiency in cups from the cupping press that is detected at 160 is communicated over lines 162 to controls for the spiral tower buffer 24 to augment the supply. Shortage of parts in the buffer 24 signals cupping press 12 over line 164.

Press strokes per minute of the four redraw presses are detected and communicated to PLC 158 over lines 166, 168. Press stroke speeds are used in a computer program to set the speed of washer/dryer 50 over control line 170. The speed of the discharge from buffer 54 and the washer/dryer discharge is set to vary in accordance with the capacity level of the buffer, speeding up as the buffer level of parts lowers and slowing down as it fills up. This is indicated by control line 172. The merge wheel for ordered merge unit 36 is directly driven by the washer 50. Any back-up of parts into the separately fed accumulators 32 is detected at 174 and shuts down the appropriate press. The coating lines and their associated conveyors 62 are controlled by the speed of the discharge conveyor from buffer 54, as indicated by control line 176.

Therefore, it can be seen that by provision of appropriate accumulators and buffers at various stages in the process, as well as controlling the conveyor speed of intermediate upstream or downstream processing units, the continuous in-line process can continue to operate at optimum speed. This is despite the removal of parts at various points in the process for inspection or due to faulty manufacture.

Other modifications of the invention will become apparent to those skilled in the art and it is desired to cover in the appended claims all such modifications as fall within the true spirit and scope of the invention.

What is claimed is:

1. Process for coating and inspecting drawn metal parts, comprising the steps of:
   (a) providing a single ordered stream of drawn metal parts having a repeating sequential order, said repeating sequential order enabling identification of the drawn metal part by the location of the drawn metal part in said ordered stream;
   (b) causing said ordered stream to move with an intermittent motion having a move time and a dwell time;
   (c) providing a plurality of coating guns firing at normal firing rates during said dwell times, wherein said plurality of coating guns comprise a first coating gun assigned to coat drawn metal parts in a first sequential location in the ordered stream and a second coating gun assigned to coat drawn metal parts in a second sequential location in the ordered stream;
   (d) coating a pre-selected portion of a selected drawn metal part during a first dwell time with the first coating gun;
   (e) providing automatic inspection means for determining if the coating is defective;
   (f) inspecting the coating of said selected drawn metal part with said automatic inspection means during a second dwell time; and
   (g) enabling the second coating gun to coat drawn metal parts in both the first sequential location in the ordered stream that was previously assigned to be coated by the first coating gun and in the second sequential location in the ordered stream if the inspected coating is defective.

2. The process according to claim 1, wherein said enabling step (g) comprises firing the second coating gun at twice said normal firing rate.

3. The process according to claim 1, wherein said enabling step (g) comprises shifting the position of said second coating gun along said ordered stream and also firing the second coating gun at twice said normal firing rate.

4. Process for coating and inspecting drawn metal parts, comprising the steps of:
   (a) providing a single ordered stream of drawn metal pans having a repeating sequential order, said repeating sequential order enabling identification of the drawn metal part by the location of the drawn metal part in said ordered stream;
   (b) causing said ordered stream to move with an intermittent motion having a move time and a dwell time;
   (c) providing a plurality of coating guns operating at normal firing rates during said dwell times, wherein said plurality of coating guns comprise a first coating gun assigned to coat drawn metal parts in a first sequential location in the ordered stream and a second coating gun assigned to coat drawn metal parts in a second sequential location in the ordered steam;
   (d) coating a pre-selected portion of a selected drawn metal part during a first dwell time with the first coating gun;
   (e) providing automatic inspection means for determining if the coating is defective;
   (f) inspecting the coating of said selected drawn metal part with said automatic inspection means during a second dwell time;
   (g) shutting down said first coating gun if the coating is defective, said selected coating gun being identified by the location of the removed drawn metal part in the ordered stream; and,
   (h) enabling the second coating gun to coat drawn metal parts in both the first sequential location in the ordered stream that was previously assigned to be coated by the first coating gun and in the second sequential location in the ordered stream.

5. The process according to claim 4, wherein said enabling step (h) comprises firing the second coating gun at twice said normal firing rate.

6. The process according to claim 4, wherein said enabling step (h) comprises shifting the position of said second coating gun along said ordered stream and also firing the second coating gun at twice said normal firing rate.

* * * * *

UNITED STATES PATENT AND TRADEMARK OFFICE
CERTIFICATE OF CORRECTION

PATENT NO. : 6,958,170 B2  
DATED : October 25, 2005  
INVENTOR(S) : John A. Benaglio, Grant Demerchant and Volker Seefeldt It is certified that error appears in the above-identified patent and that said Letters Patent is hereby corrected as shown below:

<u>Title page,</u>  
Item [57], ABSTRACT,  
Line 3, delete "Pats" and replace with -- Parts --.

<u>Column 8,</u>  
Line 28, delete "pans" and replace it with -- parts --.

Signed and Sealed this

Twenty-first Day of March, 2006

JON W. DUDAS  
*Director of the United States Patent and Trademark Office*